United States Patent [19]

LeGrand et al.

[11] 4,204,025

[45] May 20, 1980

[54] GLASS-POLYCARBONATE LAMINATE

[75] Inventors: Donald G. LeGrand, Burnt Hills, N.Y.; Gina G. Vitale, Arlington, Va.

[73] Assignee: General Electric Company, Pittsfield, Mass.

[21] Appl. No.: 962,614

[22] Filed: Nov. 21, 1978

[51] Int. Cl.² .................. B32B 17/10; B32B 27/08; B32B 27/30

[52] U.S. Cl. .................. 428/409; 156/99; 428/412; 428/442; 428/447; 428/451; 428/518

[58] Field of Search ............ 428/412, 409, 442, 447, 428/448, 451, 518, 911; 156/329, 332, 99, 106

[56] References Cited

U.S. PATENT DOCUMENTS

| | | | |
|---|---|---|---|
| 3,420,679 | 1/1969 | Gifford et al. | 428/412 X |
| 3,458,342 | 7/1969 | Cormia | 428/412 X |
| 3,520,768 | 7/1970 | Deilstocker et al. | 428/332 X |
| 3,666,614 | 5/1972 | Snedeker et al. | 428/412 |
| 3,707,397 | 12/1972 | Gagnon | 428/412 |
| 3,996,195 | 12/1976 | Sato et al. | 427/387 X |
| 4,027,072 | 5/1977 | Molari | 428/412 |
| 4,123,588 | 10/1978 | Molari | 428/412 |
| 4,126,730 | 11/1978 | Molari | 428/412 |

*Primary Examiner*—Harold Ansher
*Attorney, Agent, or Firm*—Myron B. Kapustij; William F. Mufatti

[57] ABSTRACT

A glass-polycarbonate laminate wherein a glass layer is bonded to a polycarbonate layer by a bonding system comprised of an organopolysiloxane-polycarbonate block copolymer bonding agent and a polyvinylidine chloride primer, said primer being applied onto either the glass layer or onto said block copolymer.

7 Claims, No Drawings

GLASS-POLYCARBONATE LAMINATE

This invention relates to polycarbonate-glass laminates. More particularly, it relates to such laminates including a bonding interlayer of organopolysiloxane-polycarbonate block copolymer between the glass layer and the polycarbonate layer and an adhesion promoting polyvinylidene chloride primer disposed on either said glass layer or on said block copolymer.

BACKGROUND OF THE INVENTION

The use of so-called safety glazing or penetration resistant glazing for windows, windshields and the like utilizing polycarbonate resin layers as a structural component is well known. For example, glass polycarbonate resin laminates are described in U.S. Pat. No. 3,666,614, the glass and polycarbonate being cohered together using an ethylene-vinyl acetate copolymer. In U.S. Pat. No. 3,520,768, there are described laminates of relatively thick glass having a comparatively thin polycarbonate foil as the cohering material. It is also known to utilize certain polysiloxane-polycarbonate block copolymers described more particularly hereinafter as the adhesive layers.

However, due to the difficulty of bonding glass to other materials generally, and polycarbonate resin specifically, in many cases, it has not previously been possible to provide entirely satisfactory glass-polycarbonate laminates which contain the requisite degree of clarity and will not delaminate under actual use conditions, particularly upon exposure to weather and high humidity. The identification of a proper adhesive for bonding glass to polycarbonate resins to produce laminates useful as glazing presents a particularly difficult problem since the bonding agent must not detract from the optical clarity of the glass-polycarbonate laminate; must durably bond glass and the polycarbonate; and must not deleteriously affect the polycarbonate, i.e., must be compatible with the polycarbonate.

The present invention provides a glass-polycarbonate laminate wherein the laminate has good optical properties, the glass is tightly and durably bonded to the polycarbonate, and the bonding agent is compatible with the polycarbonate.

DESCRIPTION OF THE INVENTION

The instant invention comprises a glass-polycarbonate laminate wherein the glass and polycarbonate layers are bonded together by means of an organopolysiloxane-polycarbonate block copolymer adhesive and a polyvinylidene chloride adhesion promoting primer.

Any polycarbonate resin can be used in the laminate of the present invention including but not limited to those described in U.S. Pat. Nos. 3,161,615; 3,220,973; 3,312,659; 3,312,660; 3,313,777; 3,666,614; 3,989,672, among others, all of which are incorporated herein by reference. Generally, a carbonate polymer used in the instant laminates is an aromatic carbonate polymer having recurring units of the formula:

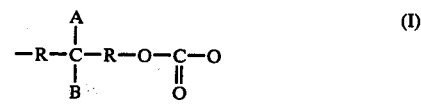

wherein each —R— is selected from the group consisting of phenylene, halo-substituted phenylene and alkyl substituted phenylene; and A and B are each selected from the group consisting of hydrogen, hydrocarbon radicals free from aliphatic unsaturation and of radicals which together with the adjoining

atom form a cycloalkane radical, the total number of carbon atoms in A and B being up to 12.

Also included herein are branched polycarbonates wherein a polyfunctional aromatic compound is reacted with the dihydric phenol and carbonate precursor to provide a thermoplastic randomly branched polycarbonate wherein the recurring units of formula I contain branching groups.

Exemplary polycarbonate resins are those derived from the reaction of bisphenol-A and phosgene. These polycarbonates have from 10–400 recurring units of the formula:

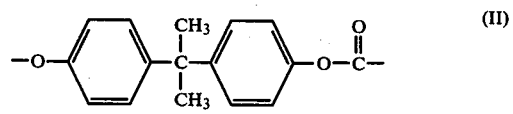

Any of the usual types of glass used in so-called safety applications can be used in conjunction with the present invention including coated or uncoated and chemically and thermally strengthened or tempered glass as well as common untempered glass where indicated.

An example of the chemically tempered glass is that which has been treated chemically with salts in an ion-exchange type process to give a higher tensile and flexural strength glass. A glass treating process of this type is disclosed in U.S. Pat. No. 3,395,998. Tempered glasses are available commercially and are sold by companies such as Pittsburgh Plate Glass Company of Pittsburgh, Pa., and Corning Glass Works of Elmira, N.Y.

The polysiloxane-polycarbonate block copolymers are known compounds which are described in U.S. Pat. Nos. 3,189,662; 3,821,325; and, 3,832,419, all of which are incorporated herein by reference.

These polysiloxane-polycarbonate block copolymers can be expressed by the average formula

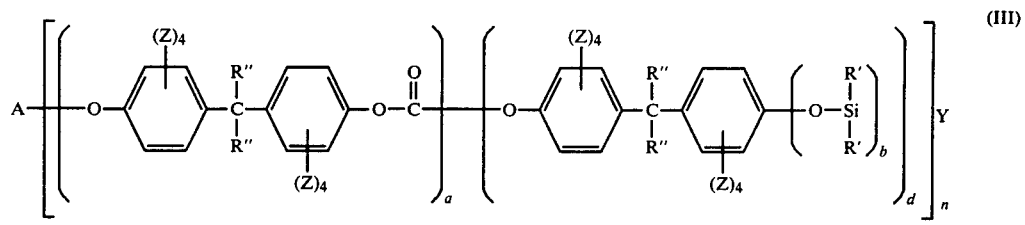

where n is at least 1, and preferably n is an integer equal to from 1 to about 1000, inclusive, a is equal to from 1 to about 200, inclusive, b is equal to from about 5 to about 200, inclusive, and preferably b has an average value from about 15 to about 90, inclusive, while the ratio of a to b can vary from about 0.05 to about 3, inclusive, and when b has an average value of from about 15 to about 90, inclusive, the ratio of a to b is preferably from about 0.067 to about 0.45, inclusive, and d is 1 or more, Y is

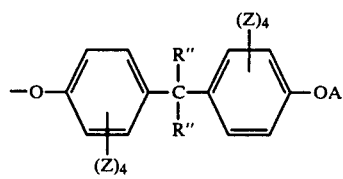

A is a member selected from the class of hydrogen and

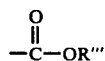

R" is a member selected from the class of hydrogen, monovalent hydrocarbon radicals and halogenated monovalent hydrocarbon radicals, R' is a member selected from the class of monovalent hydrocarbon radicals, halogenated monovalent hydrocarbon radicals and cyanoalkyl radicals, R'" is a member selected from the class consisting of monovalent hydrocarbon radicals and halogenated hydrocarbon radicals, and Z is a member selected from the class of hydrogen, lower alkyl radicals and halogen radicals and mixtures thereof.

Included within the radicals represented by R" of Formula III are aryl radicals and halogenated aryl radicals such as phenyl, chlorophenyl, xylyl, tolyl, etc.; aralkyl radicals such as phenylethyl, benzyl, etc.; aliphatic, haloaliphatic and cycloaliphatic radicals such as alkyl, alkenyl, cycloalkyl, haloalkyl including methyl, ethyl, propyl, chlorobutyl, cyclohexyl, etc; R" can be all the same radical or any two or more of the aforementioned radicals, while R" is preferably methyl, R' includes all radicals included by R" above except hydrogen, where R' can also be all the same radical or any two or more of the aforementioned R" radicals except hydrogen, and R' is preferably methyl. R' also includes, in addition to all the radicals included by R", except hydrogen, cyanoalkyl radicals such as cyanoethyl, cyanobutyl, etc., radicals. Radicals that are included within the definition of Z of Formula III are hydrogen, methyl, ethyl, propyl, chloro, bromo, iodo, etc., and combinations thereof, and Z is preferably hydrogen.

The block copolymers of the present invention can be further described as comprising recurring copolymeric units of a polydiorganosiloxane joined by substituted aryloxy-silicon linkages to a polyester of dihydric phenol and a precursor of carbonic acid, where each of said recurring copolymeric units comprises by average weight from about 10% to about 75% of said polydiorganosiloxane, and preferably from about 40 to 70% by weight.

The copolymers of Formula III can be produced by reacting at temperatures in the range of 0° C. to 100° C., preferably 20° C. to 50° C., and in the presence of an acid acceptor, a mixture of a halogen chain-stopped polydiorganosiloxane having the formula

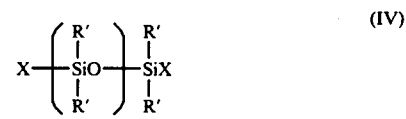

and a dihydric phenol having the formula

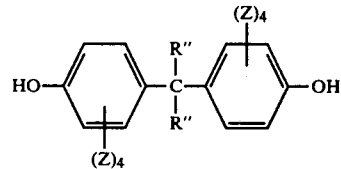

and thereafter phosgenating said reaction product until the resulting copolymer achieves a maximum intrinsic viscosity, where R", R', Z and b are as defined above, and X is a halogen radical, preferably chloro.

The halogen chain-stopped polydiorganosiloxanes of Formula IV can be made by conventional procedures such as by the controlled hydrolysis of a diorganodihalosilane, for example, dimethyldichlorosilane as taught in Patnode U.S. Pat. No. 2,381,366 and Hyde U.S. Pat. Nos. 2,629,726 and 3,902,507.

Another procedure that can be employed involves equilibrating a mixture of a diorganodichlorosilane and a cyclic polydiorganosiloxane in the presence of a metal catalyst such as ferric chloride as shown in Sauer U.S. Pat. No. 2,421,653. Although the various procedures utilized in forming the halogen chain-stopped polysiloxane are not critical, generally it has been found desirable to maintain the halogen content of the resulting halogen chain-stopped polysiloxane in the range of about 0.4 to about 35% by weight, and preferably from about 1 to about 10% by weight of said halogen chain-stopped polysiloxane. The halogen chain-stopped polysiloxane is preferably in the form of a chlorinated polydimethylsiloxane.

Dihydric phenols that are included in Formula V are, for example, 2,2-bis(4-hydroxyphenyl)propane (bisphenol-A); 2,4'-dihydroxydiphenylmethane; bis-(2-hydroxyphenyl)methane; bis-(4-hydroxyphenyl)methane; 1,1-bis-(4-hydroxyphenyl)ethane; 1,2-bis-(4- hydroxyphenyl)ethane; 1,1-bis-(4-hydroxy-2-chlorophenyl)ethane; 1,1-bis-(2,5-dimethyl-4-hydroxyphenyl)ethane; 1,3-bis-(3-methyl-4-hydroxyphenyl)propane; 2,2-bis-(3-isopropyl-4-hydroxyphenyl)propane, etc. Mixtures can also be used. Others will occur to those skilled in the art.

The copolymers of the present invention essentially comprise recurring units consisting of a polydiorganosiloxane interconnected by substituted aryloxy-silicon linkages to a polyester of carbonic acid precursor and a dihydric phenol.

These organopolysiloxane-polycarbonate block copolymers can be used either alone as such or in conjunction with well known modifiers to provide particular desired characteristics.

Illustrative of the above block copolymers is General Electric LR-3320. This material has a specific gravity of 1.12, a tensile strength of 2500 to 3900 psi, an elongation of 230 to 430, a tear strength (Die C) of 400 lbs./in., and a brittleness temperature below −76° F. and a heat deflection temperature (10 mils under 66 psi Load) of 160° F.

Another such block copolymer, specifically General Electric LR-5530, has a specific gravity of 1.07, a tensile strength of 2200 to 2500 psi, an elongation of 500–700%, a tear (Die C) of 200 lbs./in., and a brittleness temperature below −76° F. and a heat deflection temperature (66 psi) of 130° F.

The preferred manner of employing the organopolysiloxane-polycarbonate block copolymer adhesives of the present invention is in the form of film or sheets of about 5 to about 90 mils in thickness, and preferably of about 10 to about 50 mils in thickness. The organopolysiloxane-polycarbonate block copolymer may also be applied to the polycarbonate lamina substrate in the form of a solution in an inert organic solvent. The solvent is then evaporated off and a coating of the copolymer is thereby formed on the surface of the copolymer substrate.

The polyvinylidene chloride primer, which acts as an adhesion promoter, is applied to the surface of either the organopolysiloxane-polycarbonate block copolymer or to the surface of the glass substrate, preferably to the surface of the glass substrate, in layers which are at least monomolecular in depth. Preferably, the thickness of the primer ranges from about 0.1 to about 10 microns.

The primer is applied as an emulsion of polyvinylidene chloride in water. The water is then evaporated off and a layer of the desired thickness of the polyvinylidene chloride is thereby formed on the surface of the block copolymer or the glass. Such an emulsion is commercially available and is marketed by the Dewey and Almy Chemical Division of the W. R. Grace & Co., under the designation Daran ® X-801.

The laminates of the present invention may consist of a glass ply bonded by means of the instant primer and adhesive to a polycarbonate ply, or they may consist of a front glass ply bonded by means of the instant primer and adhesive to an intermediate polycarbonate ply which in turn is bonded by means of said primer and adhesive to a back glass ply. In the embodiment wherein the laminate consists of a glass ply bonded to a polycarbonate ply, it is sometimes desirable to provide the outer surface of the polycarbonate, i.e., the surface opposite the glass ply, with an abrasion resistant coating. This is due to the fact that polycarbonate resins are relatively soft materials which are readily scratched and abraded. Therefore, in some applications, where the polycarbonate lamina is subject to being abraded, it is desirable to provide the exposed polycarbonate lamina with a tough and hard abrasion and mar resistant coating. In general, such mar-resistant coatings, which are well known, can be metal oxides; modified melamines; ultraviolet hardenable organics such as acrylated monomers or mixtures of these monomers with acrylate-modified polymeric resins; inorganic glasses such as silica or alumina; polyurethanes; silicone resins; silicone resins with recurring organic groups such as polymethyl methacrylate; silica, such as colloidal silica, filled silicone resins; silicone resins derived from epoxy terminated silanes; polyamide ester resins; and, ion-beam deposited carbon, among others, are harder and relatively more scratch and abrasion resistant than the underlying polycarbonate layer which they protect.

These abrasion resistant coatings can be bonded to the polycarbonate lamina during the lamination of the glass lamina to the polycarbonate lamina or they can be applied to the polycarbonate lamina subsequent to such lamination.

In preparing the laminates of the present invention, a layer of the organopolysiloxane-polycarbonate copolymer adhesive is applied between each layer of glass and polycarbonate resin that is to be bonded together and the polyvinylidene chloride primer is applied onto this copolymer layer or onto the glass layer and the resulting laminae are bonded together under elevated temperature and pressure. The bonding is generally carried out at temperatures of from about 80° to about 205° C. and at pressures of from about 10 to about 300 pounds per square inch. The bonding operation may be conducted in any of the commonly employed autoclaves or similar pressurized devices which are generally known to those in the laminating art.

The laminates of the present invention may contain one ply or lamina of glass and one ply or lamina of polycarbonate resin bonded together by the adhesive and primer of the present invention or they may contain two laminae of glass bonded to a core of polycarbonate resin by two laminae of the organopolysiloxane-polycarbonate adhesive and polyvinylidene chloride primer. Generally, the laminae of glass are prepared from sheets of glass having thicknesses ranging from about 0.025 to about 0.75 inches.

DESCRIPTION OF THE PREFERRED EMBODIMENT

In order to more fully and clearly illustrate the present invention, the following specific examples are presented. It is intended that the examples be considered illustrative rather than limiting the invention disclosed and claimed herein. In the example, all parts and percentages are on a weight basis unless otherwise specified.

EXAMPLE 1

This example illustrates a laminate over which the present invention represents an improvement. A 125 mil thick glass lamina is primed with a 0.5 microns thick layer of gammaaminopropyltriethoxy silane. This primed glass lamina is bonded to a 250 mils thick lamina of polycarbonate resin by means of a 30 mils thick interlayer of LR-3320 block copolymer in a Carver press employing 200 pounds per square inch of pressure at 130° C. for 30 minutes. This bonding step is followed by a cooling quench under pressure to reduce the temperature to about 75° C.

EXAMPLE 2

This example illustrates another laminate over which the present invention represents an improvement. A 125 mil thick unprimed glass lamina is bonded to a 250 mils thick lamina of polycarbonate resin by means of a 30 mils thick interlayer of LR-3320 block copolymer in a Carver press employing 200 pounds per square inch of pressure at 130° C. for 30 minutes. This bonding step is followed by a cooling quench under pressure to reduce the temperature to about 75° C.

EXAMPLE 3

A 125 mil thick glass lamina is primed with a polyvinylidene chloride emulsion containing 50% solids. The water is evaporated off leaving a primer layer 10 microns thick of polyvinylidene chloride on the glass lamina. This primed glass lamina is bonded to a 250 mils thick lamina of polycarbonate resin by means of a 30 mils thick interlayer of LR-3320 block copolymer in a Carver press employing 200 pounds per square inch of pressure at 130° C. for 30 minutes. This bonding step is followed by a cooling quench under pressure to reduce the temperature to about 75° C.

EXAMPLE 4

A 125 mil thick glass lamina is primed with a polyvinylidene chloride emulsion containing 2% solids. The water is evaporated off leaving a primer layer 2 microns thick of polyvinylidene chloride on the glass lamina. This primed glass lamina is bonded to a 250 mils thick lamina of polycarbonate resin by means of a 30 mils thick interlayer of LR-3320 block copolymer is a Carver press employing 200 pounds per square inch of pressure at 130° C. for 30 minutes. This bonding step is followed by a cooling quench under pressure to reduce the temperature to about 75° C.

The adhesion of the laminae of the laminates prepared in Examples 1-4 was measured using a test procedure employed by NASA, Goddard Space Flight Center, Green Belt, Md., entitled "Peel Resistance of Adhesive Bonds Accurately Measured" and described in Tech. Brief 65-10173 GSSC 320. This test measures the amount of force, in pounds per square inch, required to peel or separate one lamina from another. Briefly, the test involves inserting a sample 10 inches×1 inch in a fixture and affixing the fixture to an Instrom load cell. A force is applied to the end of the sample in a direction 90° to the horizontal axis of the laminate and the amount of force required for delamination to occur is measured. The higher the force required for delamination to occur, the greater the adhesion of the laminae in the laminate. The results of this test are set forth in TABLE I with the adhesion being expressed in the amount of force required to break the adhesive bond between the laminae and cause delamination.

TABLE I

| Example | Adhesion (lb/in.) |
| --- | --- |
| 1 | 12 |
| 2 | 3 |
| 3 | 22 |
| 4 | 22 |

The laminates prepared in accordance with Examples 1-4 were also subjected to a thermal cycling test to determine the durability of adhesion of the laminae under varying temperature conditions. The thermal cycling test involves placing the laminates in a cold chamber maintained at 0° C. for a period of 8 hours, removing the laminates from the cold chamber and placing them, for a period of 8 hours, in a humidity chamber maintained at 70° C. and 97% relative humidity and then removing the laminates from the humidity chamber. This procedure comprises one cycle of the thermal cycling test. The number of cycles after which delamination of the laminates begins to occur is recorded and the results are set forth below in TABLE II. It was found that delamination of the laminates prepared in accordance with Examples 1-4 occurred between the glass laminae and the block copolymer layer.

TABLE II

| Example | Number of cycles after which delamination occurs |
| --- | --- |
| 1 | 4½ |
| 2 | ½* |
| 3 | 96 |
| 4 | 96 |

*Delamination occurred after removal of the laminate from the cold chamber.

As can be seen from TABLES I and II, the laminates of the present invention possess improved adhesion over laminates containing no adhesion promoting primer, i.e., Example 2, and laminates containing a primer other than the polyvinylidene chloride primer of the present invention, i.e., Example 1.

There are provided, then, by the present invention laminates of glass and polycarbonate which have improved adhesion between the glass and polycarbonate laminae.

What is claimed is:

1. An improved laminate of glass and polycarbonate resin bonded by means of a first organopolysiloxane-polycarbonate copolymer adhesive layer disposed between the glass layer and the polycarbonate layer, the improvement comprising a second polyvinylidene chloride adhesion promoting layer disposed between said first adhesive layer and said glass layer.

2. The laminate according to claim 1 wherein said organopolysiloxane-polycarbonate copolymer is comprised of (A) from 10 to 75 percent by weight of a polydiorganosiloxane composed of from about 5 to about 200 chemically combined diorganosiloxy units consisting essentially of dialkylsiloxy units which are connected to each other by silicon-oxygen-silicon linkages wherein each of the silicon atoms has two organo radicals attached through a carbon-silicon bond and (B) from 90 to 25 percent by weight of an intercondensation product of a dihydric phenol and a carbonyl halide, where said polydiorganosiloxane and said intercondensation product are joined by aryloxy-silicon linkages.

3. The laminate according to claim 2 wherein said polyvinylidene chloride adhesion promoter is used as a primer on the lamina of glass.

4. The laminate according to claim 1 wherein a plurality of layers of glass are bonded to said resin.

5. The laminate according to claim 3 and further containing a layer of abrasion resistant material bonded to the outer exposed surface of the lamina of polycarbonate resin, said abrasion resistant material being harder than said polycarbonate resin.

6. An improved laminate of glass and polycarbonate resin containing at least one glass lamina bonded to at least one polycarbonate lamina by means of an intermediate bonding layer of an organopolysiloxane polycarbonate copolymer adhesive disposed between said glass lamina and said polycarbonate resin lamina, the improvement comprising an adhesion promoting primer layer of polyvinylidene chloride disposed intermediate said glass lamina and said organopolysiloxane-polycarbonate copolymer layer.

7. A process for forming a polycarbonate-glass laminate comprising the steps of (i) applying composition comprised of a polyvinylidene chloride emulsion to a glass lamina; (ii) evaporating off the water from said emulsion thereby forming a primer layer on said glass lamina; and, (iii) adhesively bonding the primed glass lamina to a polycarbonate lamina with an adhesive which comprises an organopolysiloxane-polycarbonate block copolymer.

* * * * *

UNITED STATES PATENT AND TRADEMARK OFFICE
CERTIFICATE OF CORRECTION

PATENT NO. : 4,204,025
DATED : May 20, 1980
INVENTOR(S) : Donald G. LeGrand; Gina G. Vitale It is certified that error appears in the above-identified patent and that said Letters Patent are hereby corrected as shown below:

Column 7, line 33, "is" should read -- in --.

Claim 7, Column 9, line 8, "(i) applying composition" should read -- (i) applying a priming composition --.

Signed and Sealed this

Sixth Day of September 1983

[SEAL]

Attest:

GERALD J. MOSSINGHOFF

Attesting Officer     Commissioner of Patents and Trademarks